United States Patent
Nagendra

(10) Patent No.: US 7,536,681 B2
(45) Date of Patent: May 19, 2009

(54) PROCESSING SECURE METADATA AT WIRE SPEED

(75) Inventor: Gururaj Nagendra, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 11/086,827

(22) Filed: Mar. 22, 2005

(65) Prior Publication Data

US 2006/0218527 A1 Sep. 28, 2006

(51) Int. Cl.
*G06F 9/45* (2006.01)
(52) U.S. Cl. ...................................... 717/136
(58) Field of Classification Search ......... 717/136–137, 717/143–144; 709/231–232
See application file for complete search history.

(56) References Cited

U.S. PATENT DOCUMENTS

| | | | | |
|---|---|---|---|---|
| 6,772,413 | B2 | 8/2004 | Kuznetsov | 717/136 |
| 7,287,217 | B2* | 10/2007 | Kuznetsov et al. | 715/235 |
| 7,293,262 | B2* | 11/2007 | Sengodan | 717/136 |
| 7,305,615 | B2* | 12/2007 | Ross | 715/234 |
| 7,444,644 | B1* | 10/2008 | Slaughter et al. | 719/315 |
| 7,480,856 | B2* | 1/2009 | Jones | 715/234 |
| 2002/0178299 | A1* | 11/2002 | Teubner | 709/320 |
| 2003/0212671 | A1* | 11/2003 | Meredith et al. | 707/3 |
| 2005/0108518 | A1* | 5/2005 | Pandya | 713/151 |
| 2005/0273772 | A1* | 12/2005 | Matsakis et al. | 717/136 |
| 2006/0026287 | A1* | 2/2006 | Ternullo | 709/227 |
| 2006/0117307 | A1* | 6/2006 | Averbuch et al. | 717/143 |
| 2006/0168511 | A1* | 7/2006 | Bauer et al. | 715/513 |
| 2006/0253465 | A1* | 11/2006 | Willis et al. | 707/100 |
| 2006/0265689 | A1* | 11/2006 | Kuznetsov et al. | 717/117 |

OTHER PUBLICATIONS

Chan et al. "Efficient filtering of XML documents with Xpath expressions", Dec. 2002, Springer-Verlag New York, Inc, The VLDB Journal vol. 11, Issue 4, pp. 354-379.*
Grust et al. "Accelerating Xpath Evaluation in Any RDBMS", Mar. 2004, ACM, TODS vol. 29 Issue 1, pp. 91-131.*
Datapower: XA35 XML Accelerator Data Sheet. http://www.datapower.com/docs/datasheet_xa35.pdf. 2002.
Datapower: XS 40 XML Security Gateway Data Sheet. http://www.datapower.com/docs/datasheet_xs40.pdf. 2002.
Datapower: XI50 XML Integration Appliance Product Brief. http://www.datapower.com/products/xi50.html. Accessed Mar. 31, 2005.

* cited by examiner

*Primary Examiner*—Wei Y Zhen
*Assistant Examiner*—Anna Deng
(74) *Attorney, Agent, or Firm*—Trop, Pruner & Hu, P.C.

(57) ABSTRACT

In one embodiment, the present invention includes a method for receiving an Extensible Markup Language (XML) packet at a host processor of a resource-constrained device, such as a mobile device or the like, and forwarding the XML packet to a programmable accelerator of the resource-constrained device. Then, using the programmable accelerator, the XML packet may be processed and information from the XML packet may be provided to the host processor. Other embodiments are described and claimed.

18 Claims, 4 Drawing Sheets

PROCESSING SECURE METADATA AT WIRE SPEED

BACKGROUND

The present invention relates to the processing of data and more particularly to processing of metadata.

Extensible Markup Language (XML) has become the de facto standard for flexible information exchange (storage and communication) over the Internet. For instance, XML is commonly used as a message format in distributed systems. Typically, in order to process an XML message, it is converted to an intermediate representation such as a document object model (DOM) tree, and is further manipulated and propagated to another system over a network as an XML message or packets. Such communications, which are prevalent in electronic commerce (e-commerce) applications, provide the ability for various entities to manipulate data within an XML document and provide the manipulated document back to its source.

To obtain and utilize data within an XML document, which may be information in many different forms depending on the application, the document must be parsed. However, the parsing process can be quite computationally intensive. For example, processing of metadata associated with an XML document is both compute and memory intensive. The volume of metadata being created and sent on networks is increasing tremendously. Furthermore, technologies such as web services, service oriented architectures (SOA), and other managed runtime technology-based functionality have made metadata languages the de facto standard for persistent and network data.

New usage models have started driving the need for mobile solutions in the enterprise space. The demand for scalable, reliable, available, secure and high performance mobile products and solutions is rising rapidly. Many new mobile technologies support XML including, for example, Microsoft's .NET framework and .NET compact framework, and Java Community Process's Java Specification Requests (JSRs), such as web services (JSR 172), among others.

Typically, in enterprise systems, XML packets are queued and provided from an enterprise device (e.g., an enterprise server) to a hardware accelerator to offload the parsing of the XML packets. These packets are generally buffered until a certain amount of packets or data have been stored. The stored packets are then offloaded at a single delayed time from their receipt. Accordingly, a time lag exists between receipt of XML packets and processing of the packets. Further, significant resources are consumed by the movement of the packets throughout different locations in an enterprise. Accordingly, inefficiencies at the enterprise devices also exists.

Complicating matters further are the use of mobile technologies in such enterprise systems, as the mobile devices typically lack the computing and storage resources of other enterprise devices. This leads to poor performance in processing of XML packets on mobile devices. Accordingly, XML packets are typically processed away from mobile devices, slowing handling of the packets and delaying receipt of data from those packets at the mobile devices.

Some mobile devices used in an enterprise space can receive voluminous XML packets, further increasing complexity of processing the packets. XML processing on huge amounts of XML payload packets on a client device is time consuming, utilizes significant computing power and memory, thus slowing down the overall system performance and increasing the power consumption.

Accordingly, a need exists to improve handling of XML documents, particularly in mobile technologies.

SUMMARY

In various embodiments, processing of data packets may be handled in resource-constrained devices thereby reducing overhead on a producer device. In such manner, usage models using XML may be more effectively handled. In various embodiments, XML processing operations may be done on a consumer device rather than on a producer device. Further, the metadata of an XML packet may be processed on a mobile device at wire speed. Thus, the XML packet may be parsed and XML events may be generated and sent to an application running on a host processor of the mobile device without any loss in performance. In some embodiments, a programmable metadata accelerator (PMA) to perform packet processing may be provided. The PMA may work in tandem with security features of a processor to process secure XML packets at wire speed for mobile applications. By avoiding consumption of the core's resources to process the data, the overhead of processing secure metadata in mobile applications may be reduced, increasing device performance and reducing power consumption.

DETAILED DESCRIPTION

In various embodiments, processing of data packets, and particularly XML packets, may be handled in mobile and other resource-constrained devices (e.g., client devices), thereby reducing overhead on a producer device (e.g., a remote server). In such manner, usage models using XML, such as e-mail, various messaging, inventory management, information technology (IT) device management, and shipment tracking (among other models) may be more effectively handled.

One characteristic of XML payloads on mobile devices is that they are typically small in size, but the volume of payloads can be very large. As an example, a mobile device subscribing to different really simple syndication (RSS) services may receive a large volume of payloads over a short period of time. Each packet includes data to be processed. Such data however is wrapped in protocol header information. For example, XML metadata is used to wrap the data. Since the communication between devices is typically done over a network, the XML payloads may be made secure in some embodiments via encryption and signing to avoid any tampering of the data information. Hence security operations may be performed (e.g., decryption and verification) before getting to the underlying data.

In various embodiments, XML processing operations, such as XML parsing, XML validation, and XSL transformation (XSLT) among others may be done on a consumer (i.e., client) device rather than on a producer (e.g., server) device. Further, the metadata of an XML packet may be processed on a mobile device at wire speed. Thus, the XML packet is parsed and XML events are generated and sent to an application running on a host processor of the mobile device without any loss in performance.

In some embodiments, a programmable metadata accelerator (PMA) to perform packet processing may be provided. In some embodiments, the PMA may be supplemental hardware to a processor core and may be on the same silicon as the processor core. The PMA may work in tandem with security features of a processor to process secure XML packets at wire speed for mobile applications. In some embodiments, the PMA may be programmable logic to receive XML data from the host processor and process it based on the commands from an application. By avoiding consumption of the core's resources to process the data, the overhead of processing secure metadata in mobile applications may be reduced, increasing device performance and reducing power consumption.

In various embodiments, the PMA may emulate the rules of an XML specification such as the Extensible Markup Language (XML) 1.0 (Third Ed.) Worldwide Web Consortium (W3C) Recommendation (Feb. 4, 2004), or another such specification to detect the elements, attributes, values and other predetermined content in XML packets. Thus the rules may be programmed into the PMA so that the PMA may be flexibly edited when a relevant XML specification is changed or enhanced.

Figure 1:
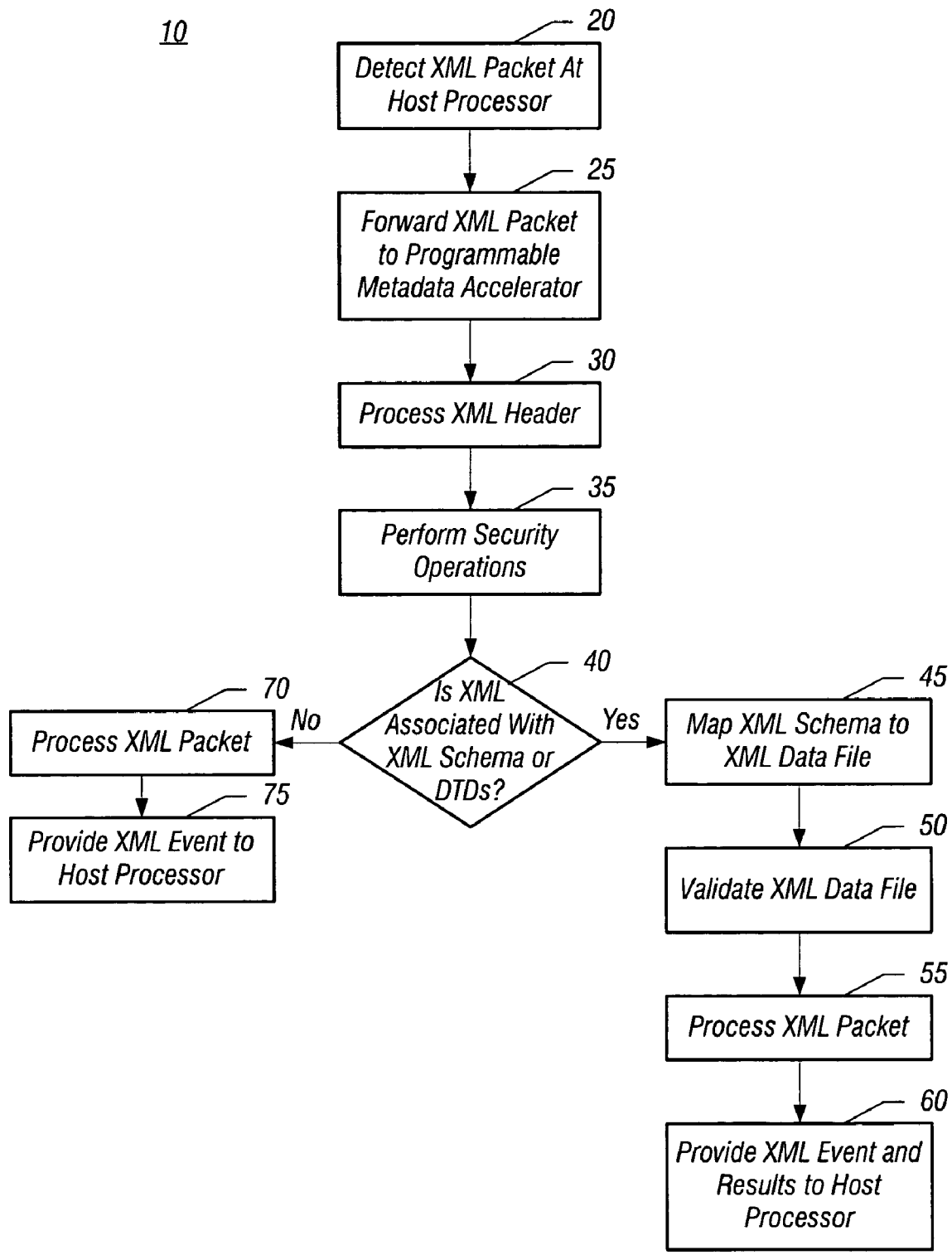
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to receive and process XML packets on a resource-constrained device, such as a mobile device. Although described herein in the context of XML packets, the scope of the present invention is not so limited, as embodiments may be used to process other data packets, including other extensible packets (e.g., Extensible Stylesheet Language (XSL)) and other packets to be received by a mobile device.

Method 10 may begin by detecting an XML packet at a host processor of the device (block 20). For example, XML packets may be received from a network wirelessly. Alternately, packets may be downloaded when the mobile device is connected to the network and stored in a storage of the mobile device for later processing. For example, the device may include a disk or smart card or other storage medium to store the data.

When the host processor detects that the incoming data is an XML packet, it may forward the XML packet to a PMA (block 25). The PMA may be located on the same integrated circuit (IC) as the host processor. As an example, the PMA may be a separate block of the host processor silicon that is optimized to handle XML packets. In various embodiments, the host processor may choose to send XML packets to a PMA based on various criteria. As an example, the host processor may offload XML packets based on processor and/or memory utilization rates. If a limited number of XML packets are incoming, or suitable software exists for processing XML packets on the host processor, the host processor may choose to handle the XML packets itself, to reduce overhead in transferring packets to the PMA. However, when significant incoming packets are occurring, or utilization rates are high, a host processor may choose to forward XML packets to the PMA.

On receipt of an XML packet from the host processor, the PMA may process an XML header associated with the XML packet (block 30). For example, the PMA may read and process the XML header to determine information about the packet. If the XML content in the XML packet is embedded in a service oriented architecture protocol (SOAP) envelope, the PMA may process the SOAP header and extract the XML content from the packet.

Next, the PMA may perform security operations (block 35). For example, either alone or in combination with a security block in the IC, security operations such as signature verification and decryption may occur. The security operations may also cause the PMA or the security block to communicate with a remote server or client device that sent the packet, based on a given security protocol.

After performing security operations, the PMA may determine whether the XML content is associated with XML schema or document type definitions (DTDs) (diamond 40). If the packet is associated with schema or DTDs, the PMA may map the XML schema to the underlying XML data file (block 45). Furthermore, the PMA may validate the XML data file (block 50), and process the XML packet (block 55). Finally, the PMA may provide the XML event and results to the host processor (block 60). More specifically, the data may be provided to an application running on the host processor that desires the data. For example, the application may be a media player and the information may include a description of given media content (and the content itself) for use by the application. In some embodiments, a PMA may implement a Simple Application Programming Interface (API) for XML (SAX) model in which events are generated for each event detected without any saving of the XML packet to memory. In such manner, XML packets may be efficiently processed. However, in other embodiments a document object model (DOM)-based PMA may be provided that converts XML packets into a DOM tree or other intermediate representation for storage to memory and further processing.

Still referring to FIG. 1, if instead at diamond 40 the XML content is not associated with any schema or DTDs, control may pass to block 70. There, the PMA may process the XML packet (block 70). Furthermore, the PMA may provide the XML event to the host processor (block 75). Accordingly, an application running on the host processor may process the XML event in the absence of schema or DTDs.

In various embodiments, method 10 may be implemented at wire speed. That is, the processing performed by a PMA in accordance with an embodiment of the present invention may be in real time as packets are received. Thus, XML packets are not queued for later processing or delivery to an off-device engine. Instead, XML packets may be processed dynamically or on-the-fly using a PMA. Furthermore, the overhead of processing XML packets, particularly packets containing secure metadata, may be reduced by using the PMA to process the packets, rather than software running on the host processor.

Figure 2:
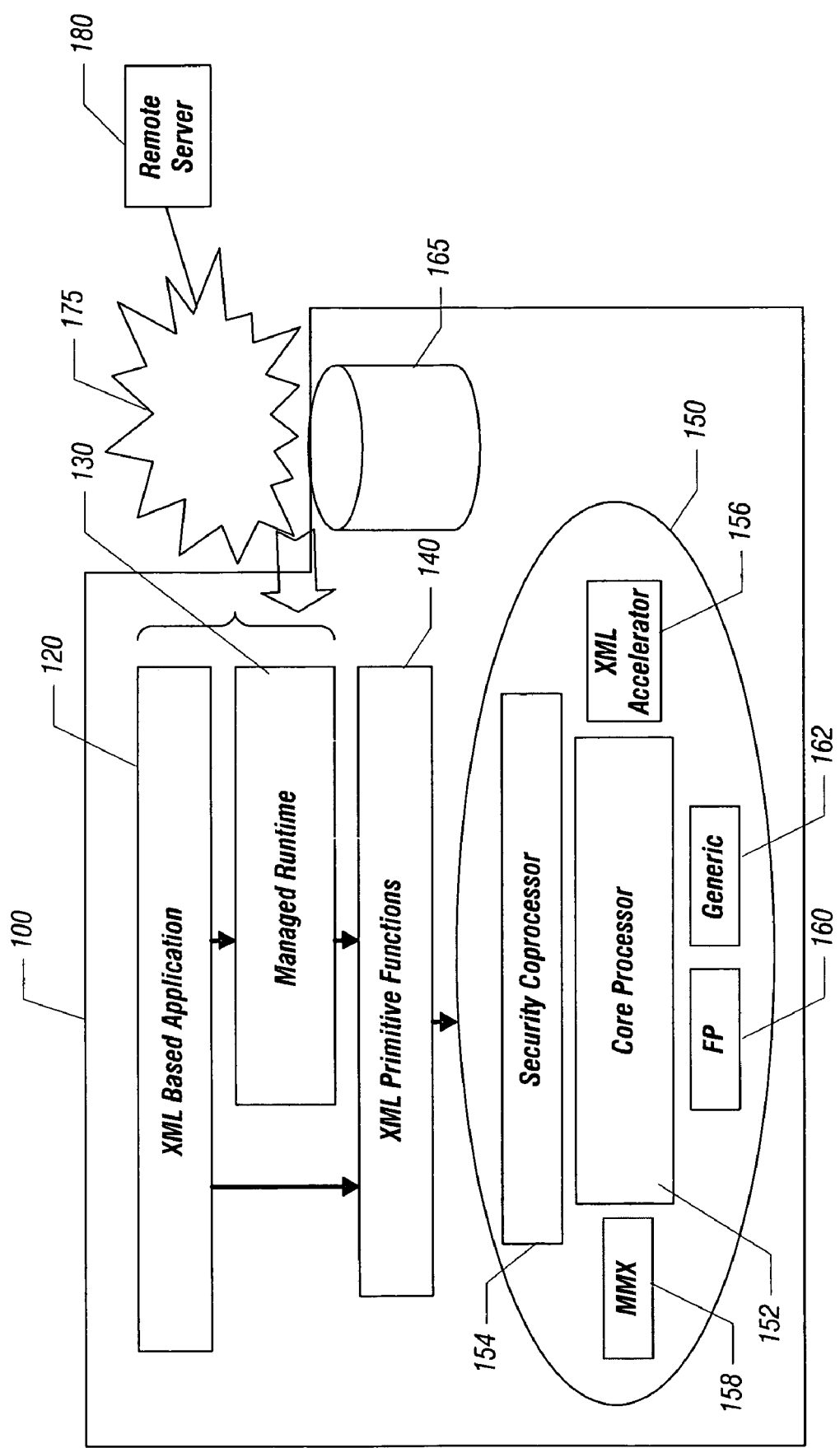
FIG. 2 is a block diagram of a system in accordance with an embodiment of the present invention.

Referring now to FIG. 2, shown is a block diagram of a system in accordance with an embodiment of the present invention. As shown in FIG. 2, system 100 may be a mobile device, such as a cellular telephone, personal digital assistant (PDA), set-top box, network processor platform or the like, or another resource-constrained device. FIG. 2 shows that system 100 is coupled to a remote server 180 via a network 175. As an example, network 175 may be a wireless network, such as a cellular telephone network, a wireless local area network (WLAN), a wireless metropolitan area network (e.g., a Worldwide Interoperability for Microwave Access (WiMAX) network), a Voice over Internet Protocol (VoIP) network or the like. Alternately, system 100 may be coupled to network 175 by a wired connection when available. In any manner, system 100 receives XML packets from remote server 180. These packets may be sent directly to a host processor of the system as will be discussed below, or incoming packets may be stored on a storage 165, which may be any type of storage, such as a disk, a flash memory, smart card, or the like.

As further shown in FIG. 2, various software layers may be present in system 100. For example, different application programs, may be used to provide desired functionality to system 100. As an example, an XML-based application 120 may provide desired functionality such as inventory management. Application 120 may be executed in a managed runtime environment (MRTE) 130, such as a JAVA™ or a Microsoft .NET environment, although the scope of the present invention is not so limited. Such a runtime environment abstracts the underlying platform hardware.

Furthermore, system 100 may include XML primitive functions 140 that are optimized to take advantage of hardware capabilities and components of system 100. More specifically, primitive functions 140 may be optimized for specific platform hardware, e.g., the processor within an integrated circuit (IC) 150 of system 100. In the embodiment of FIG. 2, IC 150 includes various processing blocks, including a processor core and related subsystems or blocks to perform specialized functions. Thus primitive functions 140 may be optimized to take advantage of functionality handled by the particular blocks of IC 150. Such primitive functions 140 may abstract hardware within IC 150 and enable more efficient usage of IC 150. Particularly, such primitive functions may allow different applications to execute on system 100 with the least amount of integration issues with respect to using IC 150, particularly for XML processing functions. In other words, primitive functions 140 act to bridge the gap between the actual hardware of the system (e.g., IC 150) and managed run-time environment 130. In various embodiments, primitive functions 140 may control flow of XML packets when received by IC 150 and immediately and directly forward packets to an on-board XML accelerator, as will be discussed further below.

Still referring to FIG. 2, IC 150 may be an applications processor, general-purpose or special-purpose processor such as a microprocessor, microcontroller, application specific integrated circuit (ASIC), a programmable gate array (PGA) and the like. In various embodiments, IC 150 may be a processor optimized for resource-constrained devices, in that it may be optimized for reduced size and power consumption. For example, IC 150 may have a reduced instruction set computing (RISC) architecture, such as an architecture based on an Advanced RISC Machines (ARM) architecture. In one embodiment, a processor may be a 32-bit version of an XSCALE™ processor available from Intel Corporation, Santa Clara, Calif., although the scope of the present invention is not so limited.

IC 150 includes various blocks or cores to perform different functions, both specialized and generalized. Specifically, IC 150 includes a processor core 152 to perform control and general processing functions. In various embodiments, a security coprocessor 154 may be present to handle security functions such as encryption, decryption, signing and other security operations. Security coprocessor 154 may thus be optimized to handle such security functions more efficiently than processor core 152 and also to reduce overhead on processor core 152.

As further shown in FIG. 2, IC 150 may further include an XML accelerator 156. In various embodiments, XML accelerator 156 may be programmable logic in accordance with an embodiment of the present invention to provide for XML processing at wire speed.

Still further, IC 150 may include additional blocks to handle specialized functions. For example, a multimedia block 158 (MMX block) may more efficiently handle multimedia operations such as streaming video or other media applications. A floating-point block 160 (FP block) may provide for specialized handling of floating point functions. Finally, a generic block 162 represents additional specialized functions that may be performed outside of processor core 152 to reduce overhead and allow for more efficient processing of certain operations.

Figure 3:
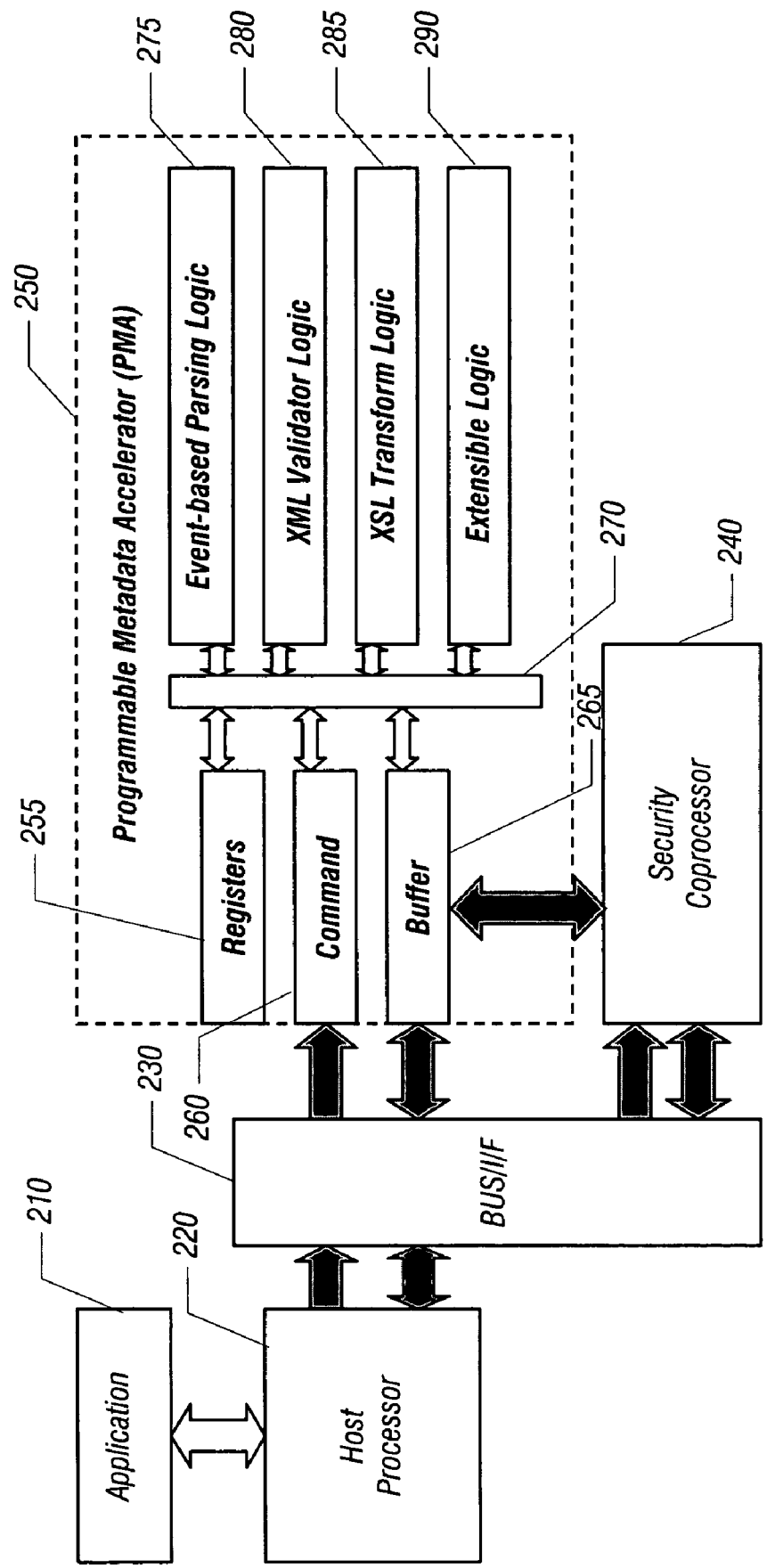
FIG. 3 is a block diagram of a hardware-based view of a system in accordance with an embodiment of the present invention.

Referring now to FIG. 3, shown is a block diagram of a hardware-based view of a system in accordance with an embodiment of the present invention. More specifically, FIG. 3 shows the interaction between an application program 210, a host processor 220 and a PMA 250 in accordance with an embodiment of the present invention. FIG. 3 further shows exemplary components of PMA 250.

During operation, application program 210 may communicate with a host processor 220 to request performance of various activities, including processing of XML packets, and particularly processing of secure packets at wire speed. To reduce overhead on host processor 220 and to enable wire speed processing, host processor 220 may send such XML packets to PMA 250 via a bus/interface 230. In one embodiment, bus/interface 230 may be an Advanced Peripheral Bus (APB) and may further include a direct memory access (DMA) interface, although the scope of the present invention is not so limited. Bus/interface 230 is coupled to PMA 250 and a security coprocessor 240. In various embodiments, host processor 220, bus/interface 230, security coprocessor 240 and PMA 250 may all reside on a single chip, such as IC 150 of FIG. 2.

FIG. 3 further shows a detailed implementation of PMA 250 in accordance with one embodiment of the present invention. As shown, PMA 250 includes different programmable logic to efficiently perform various functions with respect to processing of XML data. Specifically, PMA 250 includes an event-based parsing logic 275 to parse XML packets based on schema or DTDs associated with packets. PMA 250 may further include an XML validator logic 280 to validate incoming XML packets. Still further, PMA 250 may include an XSL transform logic 285 to perform XSL transformations. It is to be understood that the various logic within PMA 250 may be programmable based on changes to implementations in policies and protocols for handling of XML data. Accordingly, in addition to the reprogramming of the above logic blocks, PMA 250 may further include an extensible logic 290 to implement various functions that enable more efficient processing of XML packets.

As further shown in FIG. 3, the various logic blocks may be coupled via an interface 270 to a plurality of registers 255 and a command block 260 which may be used to store commands received from host processor 220. Further, a buffer 265, which may be a shared buffer, may be used to store XML packets and related data. As shown in FIG. 3, buffer 265 may be shared between PMA 250 and security coprocessor 240 to allow both blocks to access and use data stored in buffer 265 for performing desired functions on the data.

While shown in FIG. 3 as coupled between PMA 250 and security coprocessor 240 it is to be understood that buffer 265 may be shared between other coprocessors in a platform. As an example, buffer 265 may be shared also with a multimedia coprocessor, e.g., MMX block 158 or other coprocessors or blocks within a particular processor architecture. As an example, in some embodiments a motion pictures expert group (MPEG-7) coprocessor may be present to handle XML data packets including MPEG-7 data. Alternately, such MPEG-7 XML packets may be handled using PMA 250 and MMX block 158. In these embodiments, buffer 265 thus may also include direct links to these other coprocessors, such as MMX block 158 and the like. While FIG. 3 primarily shows hardware and software that executes within a host processor, it is to be understood that in other embodiments, such hardware may be distributed throughout a system.

Figure 4:
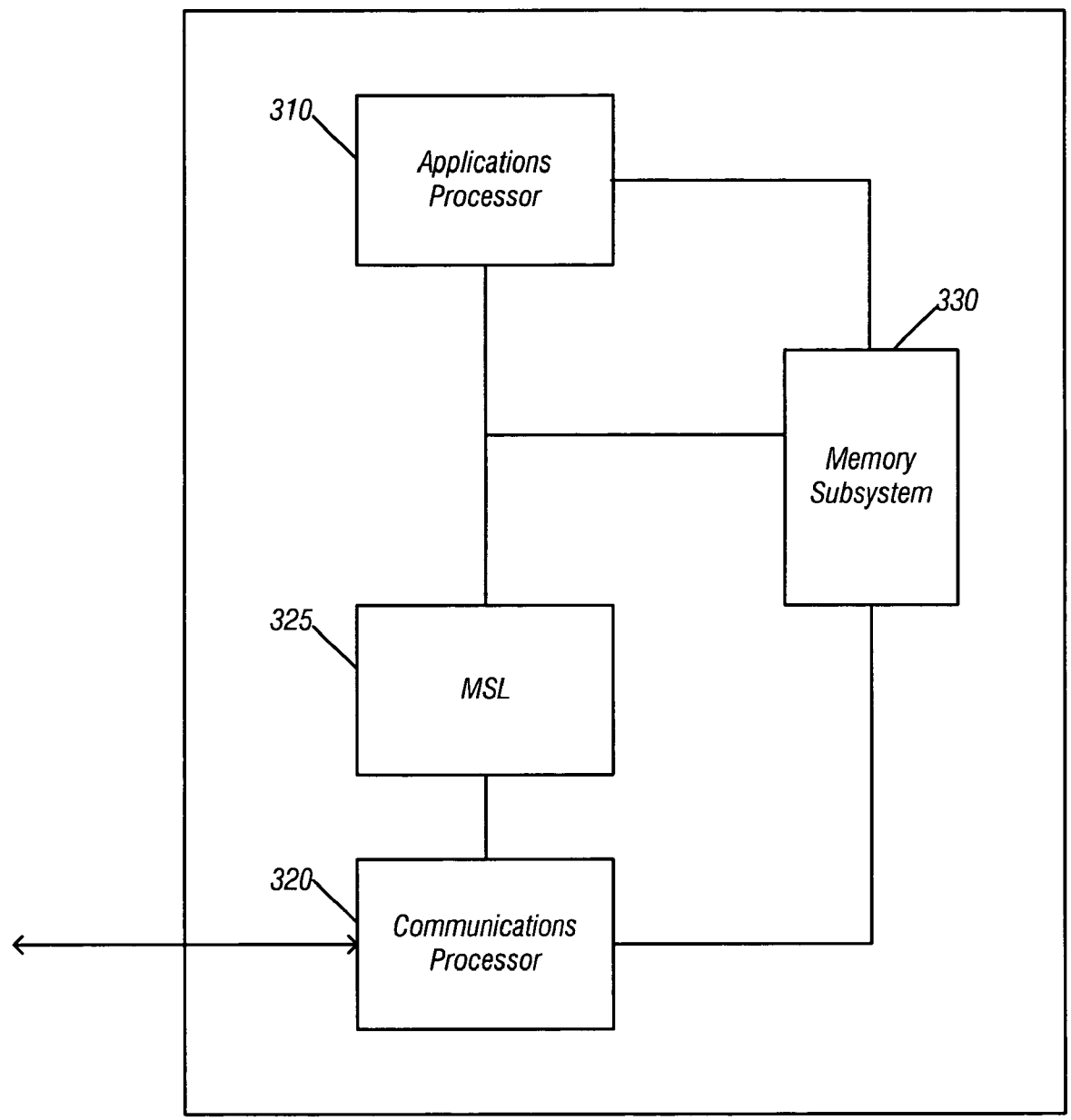
FIG. 4 is a block diagram of a resource-constrained device with which embodiments of the invention may be used.

As described above, in various embodiments XML packets may be efficiently processed at wire speed in resource-constrained devices. Referring now to FIG. 4, shown is a block diagram of one example of a resource-constrained device, namely a wireless device with which embodiments of the invention may be used. As shown in FIG. 4, in one embodiment wireless device 300 includes an applications processor 310. Applications processor 310 may be used to execute various applications such as data processing functions, modification and manipulation of digital content and the like. In particular, applications processor 310 may include a PMA in accordance with an embodiment of the present invention. In one embodiment, applications processor 310 may be an XSCALE™-based processor.

Applications processor 310 may be coupled to a communications processor 320, which may be a digital signal processor (DSP) based on a micro signal architecture via an internal bus, which may include a scalable link 325 (such as a mobile scalable link), which may be formed of a plurality of gating devices to scalably transfer data between the processors. A memory subsystem 330 may be coupled to both applications processor 310 and communications processor 320, in certain embodiments. Memory subsystem 330 may include both volatile and non-volatile memory, such as static random access memory (SRAM), dynamic RAM (DRAM), flash memories, smart cards, and the like. While shown in FIG. 4 as separate components, it is to be understood that in other embodiments two or more of the components may be integrated into a single device, such as a single semiconductor device.

It is to be understood that communications processor 320 may include various functionalities including wireless communication with external sources. For example, communications processor 320 may include a wireless interface (which in turn may have an antenna). In different embodiments, the wireless interface may support a variety of data services, network technologies, and other communication schemes.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an extensible markup language (XML) packet at a host processor of a resource-constrained device, wherein the XML packet includes secure metadata;
   using a software primitive function to abstract a programmable accelerator of the resource-constrained device to an application program associated with the XML packet, and bridge a gap between a managed runtime environment and native code of the host processor;
   using a software primitive function to directly forward the XML packet to the programmable accelerator from the host processor based on amount of XML packets being transferred to the resource-constrained device;
   determining if the XML packet is associated with an XML schema or a document type definition;
   mapping the XML schema to a data file of the XML packet if the XML packet is associated with the XML schema;
   processing the XML packet with the programmable accelerator to produce results without buffering the XML packet, and
   providing the results to the host processor.

2. The method of claim 1, further comprising performing at least one security operation on the XML packet using a security module of the resource-constrained device.

3. The method of claim 1, further comprising parsing a plurality of XML packets with the programmable accelerator at wire speed.

4. The method of claim 1, wherein the programmable accelerator and the host processor are located in a single integrated circuit.

5. An apparatus comprising:
   a platform including a host processor for a mobile device, the host processor including:
     a processor core to receive an extensible markup language (XML) packet including secure metadata; and
     a programmable metadata accelerator coupled to the processor core to;
   wherein the platform is to:
     use a software primitive function to abstract the programmable accelerator to an application program associated with the XML packet, and bridge a gap between a managed runtime environment and native code of the host processor;
     use a software primitive function to directly forward the XML packet to the programmable accelerator from the host processor based on amount of XML packets to be transferred to the mobile device;
     determine if the XML packet is associated with an XML schema or a document type definition, map the XML schema to a data file of the XML packet if the XML packet is associated with the XML schema;
     process the XML packet with the programmable accelerator to produce results without buffering the XML packet; and
     provide the results to the host processor.

6. The apparatus of claim 5, wherein the host processor includes a security coprocessor to perform at least one security operation on secure extensible data packets.

7. The apparatus of claim 6, further comprising a buffer to store the secure extensible data packets, the buffer to be shared by the programmable metadata accelerator and the security coprocessor.

8. The apparatus of claim 5, wherein the programmable metadata accelerator is to process the extensible data packets at wire speed.

9. The apparatus of claim 5, wherein the host processor is to execute at least one of software primitive functions optimized for the host processor while in a managed runtime environment.

10. The apparatus of claim 5, wherein the programmable metadata accelerator comprises logic programmable to accommodate a modification to an extensible specification.

11. The apparatus of claim 5, wherein the programmable metadata accelerator comprises parsing logic, validation logic, and transformation logic.

12. An article comprising a machine-accessible storage medium containing instructions that if executed enable a system to:
  receive an extensible markup language (XML) data packet at a host processor of a mobile device, wherein the XML packet is to include secure metadata;
  use a software primitive function to abstract a programmable accelerator of the mobile device to an application program associated with the XML packet, and bridge a gap between a managed runtime environment and native code of the host processor;
  use a software primitive function to directly forward the data packet to the programmable accelerator based on amount of packets to be transferred to the mobile device;
  determine if the XML packet is associated with an XML schema or a document type definition;
  map the XML schema to a data file of the XML packet if the XML packet is associated with the XML schema;
  process the data packet with the programmable accelerator to produce results without buffering the data packet, and
  provide the results to the host processor.

13. The article of claim 12, further comprising instructions that if executed enable the system to perform at least one security operation on the data packet using a security module of the mobile device.

14. The article of claim 12, further comprising instructions that if executed enable the system to parse a plurality of data packets with the programmable accelerator at wire speed.

15. A system comprising:
  a platform including a host processor for the system, the host processor including:
    a processor core to receive an extensible markup language (XML) data packet that includes secure metadata; and
    a programmable accelerator coupled to the processor core; and
  a wireless interface coupled to the host processor;
  wherein the platform is to:
    use a software primitive function to abstract the programmable accelerator to an application program associated with the XML packet, and bridge a gap between a managed runtime environment and native code of the host processor;
    use a software primitive function to directly forward the XML packet to the programmable accelerator from the host processor based on amount of XML packets being transferred to the resource-constrained device;
    determine if the XML packet is associated with an XML schema or a document type definition;
    map the XML schema to a data file of the XML packet if the XML packet is associated with the XML schema;
    process the XML packet with the programmable accelerator to produce results without buffering the XML packet; and
    provide the results to the host processor.

16. The system of claim 15, wherein the host processor includes a security coprocessor to perform at least one security operation on secure extensible data packets.

17. The system of claim 16, wherein the host processor further comprises a buffer accessible by the accelerator and the security coprocessor.

18. The system of claim 15, wherein the system comprises a mobile device coupled to wirelessly receive the extensible data packets.

* * * * *